US012682646B2

(12) United States Patent (10) Patent No.: US 12,682,646 B2
Burri et al. (45) Date of Patent: Jul. 14, 2026

(54) METHOD AND DEVICE FOR MONITORING THE TRAVEL OPERATION OF A PERSON-TRANSPORTING INSTALLATION

(71) Applicant: Inventio AG, Hergiswil (CH)

(72) Inventors: Jürg Burri, Hirschthal (CH); Gerhard Kleewein, Pressbaum (AT); Jacky Xing, Shanghai (CN); Ferry Wu, Shanghai (CN); Georg Wagenleitner, Roßleithen (AT)

(73) Assignee: Inventio AG, Hergiswil (CH)

( * ) Notice: Subject to any disclaimer, the term of this patent is extended or adjusted under 35 U.S.C. 154(b) by 243 days.

(21) Appl. No.: 18/687,183

(22) PCT Filed: Sep. 2, 2022

(86) PCT No.: PCT/EP2022/074440
§ 371 (c)(1),
(2) Date: Feb. 27, 2024

(87) PCT Pub. No.: WO2023/036699
PCT Pub. Date: Mar. 16, 2023

(65) Prior Publication Data
US 2025/0118076 A1 Apr. 10, 2025

(30) Foreign Application Priority Data

Sep. 10, 2021 (EP) ..................................... 21195902

(51) Int. Cl.
*G06V 20/52* (2022.01)
*B66B 25/00* (2006.01)
(Continued)

(52) U.S. Cl.
CPC ............ *G06V 20/52* (2022.01); *B66B 25/003* (2013.01); *B66B 27/00* (2013.01); *B66B 29/00* (2013.01);
(Continued)

(58) Field of Classification Search
CPC ........ G06V 20/52; G06V 10/74; G06V 20/44; B66B 25/003; B66B 27/00; B66B 29/00; B66B 29/005; G08B 7/06; H04N 7/181
(Continued)

(56) References Cited

U.S. PATENT DOCUMENTS

2004/0130620 A1* 7/2004 Buehler ................. G06V 40/20
                                                                   348/E7.086
2012/0020518 A1* 1/2012 Taguchi ................. G06T 7/292
                                                                   382/103
(Continued)

FOREIGN PATENT DOCUMENTS

CN        110027956 A     7/2019
EP          1013599 A1    6/2000
(Continued)

OTHER PUBLICATIONS

International Search Report issued in application No. PCT/EP2022/074440 on Oct. 19, 2022.

*Primary Examiner* — Ali Bayat
(74) *Attorney, Agent, or Firm* — Knobbe, Martens, Olson & Bear, LLP

(57) ABSTRACT

The disclosure relates to a method for monitoring the travel operation of a person-transporting installation with a monitoring system. The at least one motion-sensing module transmits its motion sequence images to an interaction module and to a hazard analysis module; the motion sequence images are displayed on a screen of the interaction module and, at the same time, in the hazard analysis module the motion sequence images are examined for critical situations with analysis algorithms. As soon as a critical situation is recognized, a warning signal is sent to the interaction module. As a result of the warning signal, the interaction module visually and/or acoustically emphasizes the corresponding motion sequence image on the screen and gener- (Continued)

ates a confirmation input field. The travel operation of the person-transporting installation can be influenced based on a manual tapping on the confirmation input field.

20 Claims, 2 Drawing Sheets

(51) Int. Cl.

| | |
|---|---|
| *B66B 27/00* | (2006.01) |
| *B66B 29/00* | (2006.01) |
| *G06V 10/74* | (2022.01) |
| *G06V 20/40* | (2022.01) |
| *G08B 7/06* | (2006.01) |
| *H04N 7/18* | (2006.01) |

(52) U.S. Cl.
CPC .............. *G06V 10/74* (2022.01); *G06V 20/44* (2022.01); *G08B 7/06* (2013.01); *H04N 7/181* (2013.01)

(58) Field of Classification Search
USPC ......................................................... 382/107
See application file for complete search history.

(56) References Cited

U.S. PATENT DOCUMENTS

| | | | | |
|---|---|---|---|---|
| 2015/0274490 A1* | 10/2015 | Vlad | ....................... | B66B 23/14 |
| | | | | 198/321 |
| 2019/0199932 A1* | 6/2019 | Ida | .......................... | H04N 23/60 |
| 2019/0287063 A1* | 9/2019 | Skaaksrud | .............. | B60C 5/005 |
| 2021/0336455 A1* | 10/2021 | Li | ......................... | H02J 7/0047 |
| 2023/0154307 A1* | 5/2023 | Nakashima | ...... | G08B 13/19613 |
| | | | | 340/573.1 |

FOREIGN PATENT DOCUMENTS

| | | | |
|---|---|---|---|
| EP | 3647251 | A1 | 5/2020 |
| JP | 2008-174320 | A | 7/2008 |
| JP | 2021-020782 | A | 2/2021 |
| WO | WO 2009/152766 | A1 | 12/2009 |

* cited by examiner

METHOD AND DEVICE FOR MONITORING THE TRAVEL OPERATION OF A PERSON-TRANSPORTING INSTALLATION

TECHNICAL FIELD

The disclosure relates to a method for monitoring the travel operation of one or more person-transporting installations, and to a device for carrying out this method.

SUMMARY

Person-transporting installations such as escalators and moving walkways are used, for example, in department stores and large shopping centers, but also in train stations, subway stations, and airports. In the three last-mentioned settings, there can be an increased risk of accidents during peak times if time-pressed users jostle other users on the person-transporting installations. This means that jostled persons can fall on the escalator step belt or on the moving walkway plate belt and sustain serious injuries if the step belt or plate belt is not stopped by means of an emergency stop. Situations may also arise in which a reduction in speed is more beneficial to users than an emergency stop.

Video cameras are used to monitor these person-transporting installations, the video sequences of which are transmitted in real time to screens arranged in a monitoring room. From the monitoring room, a plurality of person-transporting installations is usually monitored by monitoring personnel, wherein a single monitoring operator is responsible for a group of person-transporting installations. In addition, the monitoring operator often monitors and operates the lighting, the fire alarm, the ventilation and, if necessary, other facilities such as security gates and the like in the region of their assigned group of person-transporting installations.

This high density of monitoring activities can lead to rapid fatigue and reduced attention of the monitoring operator. If a critical situation occurs on one of the person-transporting installations, reduced attention can worsen the critical situation and, in severe cases, lead to serious injuries or, in the worst case, death of the affected user.

In order to solve the above problem, monitoring rooms are set up in such a way that critical situations for users on the person-transporting installation can be automatically recognized by processing motion sequence images with image recognition. As soon as a critical situation is recognized, the corresponding motion sequence image is displayed on the monitoring room screen. The motion sequence image is provided with an identification number so that the monitoring operator can immediately identify on which person-transporting installation in their group a critical situation has occurred.

Below the screen, an equal number of physical emergency-stop switches is arranged corresponding to the number of monitored person-transporting installations, wherein each emergency-stop switch is connected to the safety circuit of the corresponding person-transporting installation. As soon as a critical situation occurs, the monitoring room personnel must find the associated emergency-stop switch of the person-transporting installation shown in the motion sequence image with its identification number and activate it.

This search can greatly reduce the emergency response speed, so that the intervention of the monitoring personnel comes too late. Additionally, in the case of dramatic scenes in the motion sequence image, the monitoring room personnel may panic and press the wrong emergency-stop switch, resulting in an emergency stop of another person-transporting installation that should not stop. This does not defuse the critical situation and causes inconvenience to the users of the stopped person-transporting installation, because a stopped installation cannot be put back into operation immediately.

In order to solve the problems described above, the object of the present disclosure is to provide a monitoring system for a person-transporting installation which can allow the monitoring room personnel to react immediately and adequately to a critical situation in order to prevent this critical situation from worsening further.

This object is achieved by a method for monitoring the travel operation of a person-transporting installation designed as an escalator or moving walkway with a monitoring system described herein. The monitoring system can comprise a hazard analysis module, an interaction module, a control module, and at least one motion-sensing module. The motion-sensing module can be directed toward an associated person-transporting installation and can capture motion sequence images that can be electronically processed. In other words, a motion-sensing module or a plurality of motion-sensing modules can be directed toward an associated person-transporting installation and can continuously record the processes or situations currently occurring on the escalator or moving walkway. Video cameras, thermal imaging cameras, laser scanners, TOF cameras, a set of multiple sensors and the like can be used as motion-sensing modules, the motion sequence images of which can be accordingly captured as a video film sequence, image sequence, thermal image sequence, etc. in an electronically processable form. When multiple motion-sensing modules per person-transporting installation are used, each can be preferably associated with a specific section or region, so that the entire escalator or the entire moving walkway is not visible in any of the motion sequence images.

According to the disclosure, the at least one motion-sensing module can transmit its motion sequence images in real time to the interaction module and to the hazard analysis module. The interaction module can serve for interaction with the monitoring personnel and can comprise at least one screen on which the motion sequence images can be displayed or visually represented.

At the same time as the motion sequence images are being displayed on the screen, in the hazard analysis module these motion sequence images can be examined for critical situations for users of the person-transporting installation with analysis algorithms. In other words, automated recognition processes or analysis methods known from the technical field of surveillance electronics, such as image analysis methods and corresponding algorithms, motion analysis methods and corresponding algorithms, statistical and heuristic evaluation methods and the like, can be used for recognizing user movements that deviate from usual movements or are atypical movements. Depending on the motion sequence of a deviating motion process, the hazard analysis module can assume a critical situation. A possible embodiment of this automated assessment process is described in more detail below. As soon as a critical situation is recognized, the hazard analysis module can send a warning signal to the interaction module.

As a result of the warning signal, the interaction module can visually and/or acoustically emphasize the motion sequence image displayed on the screen and associated with the warning signal and can generate a confirmation input field on the screen. Visual emphasis can be achieved by displaying the motion sequence image associated with the warning signal enlarged on the screen with a zoom function as soon as the warning signal reaches the interaction module. Of course, further visual emphasis can also be used, such as a yellow or red frame, which frames the motion sequence image shown on the screen. Flashing effects of this frame can also be used in order to draw maximum attention of the monitoring personnel to the displayed motion sequence image. Furthermore, attention can be drawn to the critical situation by triggering a beep in the monitoring room.

The confirmation input field shown on the screen is preferably also visually emphasized so that the monitoring personnel on duty can immediately find it on the screen. The screen can be a so-called "touchscreen", the pressure-sensitive surface of which can detect touches and convert them into input signals. Instead of a touch-sensitive screen, sensors can also be present which scan the screen in a grid pattern and can detect the position of a finger on the screen when it touches the screen surface. Based on a manual tapping of the confirmation input field shown on the screen, the interaction module can send the warning signal to the control module. As a result of the transmitted warning signal, the control module can influence the travel operation of the person-transporting installation in which the critical situation was recognized by the hazard analysis module.

As already mentioned above, an automated recognition process and assessment process of critical situations can take place in the hazard analysis module, wherein the deviating motion sequences recognized by known analysis methods can be extracted from the motion sequence images and then assessed. In order to carry out the assessment process, a set of possible critical situations can be stored in the hazard analysis module. This set can comprise various atypical motion scenarios that can be compared with the motion sequences extracted from the motion sequence images. This set of atypical motion scenarios can be generated, for example, through a machine learning process by using a dummy or stuntman to recreate and record typical critical situations such as falls or careless actions on the person-transporting installation and to include the extracted motion sequences in the set as atypical motion scenarios. Of course, the set can also be supplemented with further atypical motion scenarios which, during operation of the person-transporting installation, had led to an accident and were not recognized by the hazard analysis module. In the event of sufficient correspondence between an extracted motion sequence and an atypical motion scenario, the hazard analysis module can assume or determine the existence of a critical situation and send a warning signal to the interaction module.

The various atypical motion scenarios in the set preferably have different weightings in the sense of a ranking. According to these weightings, different actions to influence travel operations can be defined. For example, a recognized fall of a user can have a very high weighting and an emergency stop action can be defined for this high weighting, which can be initiated immediately when the monitoring personnel tap the confirmation input field. If, for example, a user enters the person-transporting installation counter to its transport direction, this critical situation can have a medium weighting and the action defined for this medium weighting can be a very gentle reduction in the transport speed, which can be initiated after a certain delay time when the monitoring personnel tap the confirmation input field. A delay time is appropriate here because the user going in the wrong direction may be doing so unintentionally and turn back as soon as he/she recognizes the wrong transport direction. Further options for influencing travel operations such as acoustic and/or visual warnings to the users of the person-transporting installation are described herein.

In other words, the travel operation can be influenced as a result of the weighting, so that, according to the weighting, the control module can immediately actuate a safety switch of the affected person-transporting installation and can initiate an emergency stop. The control module can also actuate a safety switch of the affected person-transporting installation with a predefined delay time corresponding to the weighting and can initiate an emergency stop. Furthermore, in the case of a corresponding weighting, an instruction can also be sent to a controller of the affected person-transporting installation. This instruction can then cause the controller to reduce the travel speed of a conveyor belt of the affected person-transporting installation according to a pre-specified deceleration profile.

In one embodiment of the disclosure, the monitoring system can comprise a plurality of motion-sensing modules that capture motion sequence images from at least two different person-transporting installations. Each of the motion-sensing modules can have a coding and can provide its motion sequence images with this coding, or can encode its motion sequence images accordingly. As soon as the hazard analysis module has recognized a critical situation in a motion sequence image, it can provide the output warning signal with the same coding as the motion sequence image with the critical situation. In the interaction module and/or control module, the motion-sensing modules can be clearly associated with the person-transporting installation they monitor via their coding. As a result of a received warning signal, the interaction module can visually and/or acoustically emphasize the motion sequence image associated with this warning signal. When the confirmation input field is tapped, the warning signal provided with the coding may be transmitted to the control module and the influence on the travel operation provided for the warning signal and, if necessary, as a result of its weighting can be initiated there.

In a further embodiment of the disclosure and when weighting is implemented, the hazard analysis module can send warning signals with the associated weighting to the interaction module in immediate succession when a plurality of critical situations is recognized simultaneously, wherein the motion sequence images can be emphasized visually and/or acoustically successively on the basis of their weighting. In other words, the motion sequence image with the most critical situation may be emphasized first. As soon as the monitoring personnel have tapped the confirmation input field, the motion sequence image with the second most critical situation may be emphasized, etc.

Users can often save themselves from critical situations by, for example, just holding on to the handrail when falling and thereby resolving the critical situation themselves. In such cases, the hazard analysis module may have already recognized the user's motion sequences as a critical situation before the user has saved himself/herself. In order to take these circumstances into account, in a further embodiment of the disclosure, the interaction module can also generate a cancellation input field in addition to the confirmation input field as a result of the warning signal on the screen. The cancellation input field can be visually different from the confirmation input field, so that the monitoring personnel do not confuse the two fields. Based on a manual tapping of the cancellation input field, the interaction module can be prompted to cancel the warning signal and to withdraw the associated visual and/or acoustic emphasis of the corresponding motion sequence image. By actuating the cancellation input field, forwarding to the control module may not take place, and thus the travel operation of the affected person-transporting installation may not be influenced either.

In one implementation, after the confirmation input field or the cancellation input field has been tapped, the display of the confirmation input field and/or the cancellation input field on the screen can be deleted. This can allow the situation in the motion sequence image to be further observed without being covered partially by these fields. This can also show the monitoring operator that the reaction he/she has selected is being implemented by the monitoring system.

If there are concerns that the monitoring operator could press the cancellation input field instead of the confirmation input field in a hurry despite the visual distinction, these concerns can be remedied with one implementation. This implementation provides that immediately after tapping the cancellation input field, the associated motion sequence image is preferably analyzed for a prespecified time, in the hazard analysis module. In other words, this motion sequence image can be further examined for critical situations for a prespecified time. If the monitoring operator mistakenly taps the cancellation input field instead of the confirmation input field, the same motion sequence image, along with the cancellation input field and the confirmation input field, can immediately "pop" back up and the monitoring operator can make his/her selection again as to how the monitoring system should respond.

In one embodiment of the monitoring system, the screen of the interaction module can be subdivided into a plurality of small screen regions and one large screen region, wherein there can be an associated screen region for each motion-sensing module and, when a warning signal is received, the interaction module can visually display the motion sequence image associated with the warning signal on the large screen region.

In a further embodiment, the interaction module can have a central screen and additional screens arranged in the immediate vicinity thereof, wherein there can be an associated screen for each motion-sensing module, and, when a warning signal is received, the interaction module can visually display the motion sequence image associated with the warning signal on the central screen. The central screen preferably has a larger screen area than the additional screens.

In a further embodiment, in the event of a warning signal, the interaction module can output an acoustic and/or visual warning to the users of the person-transporting installation via an output module. The output module can be arranged in the region of the person-transporting installation which is associated with the warning signal. In other words, each person-transporting installation can be associated with at least one output module which can be operated depending on the coding of the warning signal. This is preferably directed at the person-transporting installation in such a way that the acoustic warning addresses the users of this person-transporting installation or individual users, and not the entire surrounding area. The output module can be a loud-speaker, a loudspeaker system, a screen display, a projector for two-dimensional representations or holograms and the like. A combination of acoustically and visually output warnings is most effective. The warnings to be output can be tailored to the corresponding critical situation and its reso-lution, so that if an emergency stop is initiated, the other users are warned before it is initiated. Preferably, a set of different warnings is available, from which a warning adequate for the critical situation can be automatically selected, for example on the basis of the weighting described above, and output via the output module.

Since the division of the screen into a plurality of screen regions or the arrangement of a plurality of screens permits the monitoring personnel see the motion sequence images of all motion-sensing modules in real time, they can also discover unrecognized, critical situations. In this case, the monitoring operator can tap the small screen region or screen on which the critical situation is visible. Its motion sequence image can be immediately displayed on the large screen region or screen along with the confirmation input field and, if applicable, the cancellation input field. In this situation, a warning signal can be generated in the interac-tion module, which can contain the coding of the associated motion-sensing module as well as an instruction to initiate an emergency stop. When the confirmation input field is tapped, the warning signal can be forwarded to the control module which can immediately initiate the emergency stop of the affected person-transporting installation.

BRIEF DESCRIPTION OF THE DRAWINGS

Embodiments of the disclosure are described herein with reference to the accompanying drawings, wherein neither the drawings nor the description are intended to be inter-preted as limiting the disclosure. Identical or equivalent features have the same reference signs. In the drawings.

DETAILED DESCRIPTION

Figure 1:
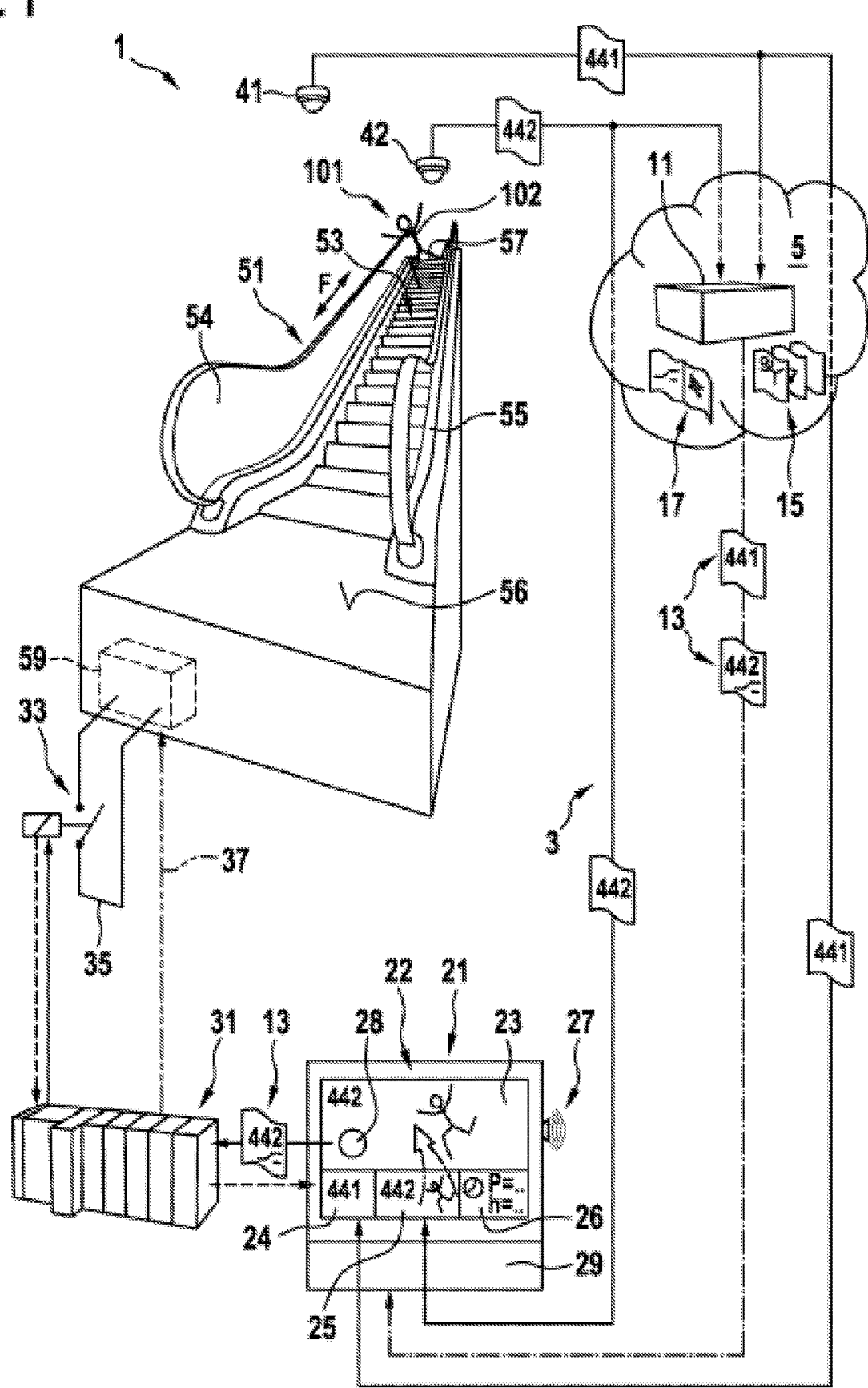
FIG. 1: is a three-dimensional view of a person-transport-ing installation, the travel operation of which is to be monitored, and a monitoring system for monitoring this person-transporting installation.

FIG. 1 shows a monitoring system 1 for a person-transporting installation 51. The monitoring system 1 has a hazard analysis module 11, an interaction module 21, a control module 31, and two motion-sensing modules 41, 42. The aforementioned modules 11, 21, 31, 41, 42 are con-nected to one another via a data network 3. The design of the data network 3 is not shown in detail, since this can be set up in a variety of ways, such as via a local wired and/or wireless data network 3, via internet connections in a cloud 5, via CAN bus systems, Bluetooth connections and the like. Relevant to the disclosure is that the individual modules 11, 21, 31, 41, 42 can exchange data with one another, wherein this data exchange between the individual modules 11, 21, 31, 41, 42 can take place unidirectionally or bidirectionally as required. The connections of the data network 3 are symbolically represented with arrows. It should also be mentioned that at least the hazard analysis module 11, optionally also a computing unit 29 of the interaction module 21 and/or the control module 31 and its data memory, can be implemented in the cloud 5.

The two motion-sensing modules 41, 42 are directed toward the associated person-transporting installation 51. One motion-sensing module can be present provided the transport region 53 of the person-transporting installation 51 is not too long and a single motion-sensing module 41, 42 is sufficient to oversee or capture the entire transport region 53 of the person-transporting installation 51, its balustrades 54, 55 and both access regions 56, 57.

The motion-sensing module 41, 42 can capture electronically processable motion sequence images 441, 442 of situations that occur on the associated person-transporting installation 51. This can also include the immediate vicinity of the person-transporting installation 51 The immediate vicinity includes, for example, the regions of the structure (not shown) upstream of the access regions 56, 57 in which the person-transporting installation 51 is installed. The upstream regions of the structure are also referred to as entrances and may be monitored by proximity sensors of the person-transporting installation 51, which proximity sensors transmit their sensory data to an "automatic start/stop system" of the person-transporting installation 51.

Video cameras, thermal imaging cameras, laser scanners, TOF cameras, a combination of multiple sensors and the like can be used as motion-sensing modules 41, 42, wherein the motion sequence images 441, 442 of which are accordingly captured as a video film sequence, image sequence, thermal image sequence, etc. in an electronically processable form. When multiple motion-sensing modules 41, 42 are used in each person-transporting installation 51, each motion-sensing module 41, 42 will be associated with a specific section or region (see FIG. 2). These regions preferably overlap, so that there are no monitoring gaps in which critical situations 101 for users 102 can occur unobserved.

In order to efficiently and safely monitor the travel operation of the person-transporting installation 51, the motion-sensing modules 41, 42 transmit their motion sequence images 441, 442 in real time to the interaction module 21 and to the hazard analysis module 11 at the same time.

The motion sequence images 441, 442 of the two motion-sensing modules 41, 42 are also displayed side by side on a screen 22 of the interaction module 21, so that a monitoring operator (not shown) of the monitoring personnel can see the entire travel operation F of the person-transporting installation 51 in real time. In the present embodiment shown by FIG. 1, the screen 22 is subdivided into a plurality of small screen regions 24, 25, 26 and one large screen region 23. There is an associated, small screen region 24, 25 for the motion sequence images 441, 442 of each motion-sensing module 41, 42. As shown in FIG. 1, an additional small screen region 26 is defined on which, for example, operating data of the monitored person-transporting installation, ventilation, fire monitoring, and the like can be displayed.

At the same time as the motion sequence images 441, 442 are displayed on the screen 22 of the interaction module 21, they are examined for critical situations for users 101 of the person-transporting installation 51 in the hazard analysis module 11 with analysis algorithms. These analysis algorithms are based, for example, on known image processing techniques that are optimized and applied in self-learning processes using artificial intelligence in neural networks. A common image processing technique for generating information from an image is, for example, the calculation of the histogram which provides information about the statistical brightness distribution in the image. Such a histogram can serve, for example, as a configuration for further image processing steps or as information for a human user of software. Other computable information about an image is, for example, its entropy or average brightness. Based on this information, vector analyses can follow how individual prominent points move relative to one another and conclusions can be drawn about user motion scenarios 102. As soon as a motion sequence of a user 101 has been extracted, for example, as a skeletal motion sequence, and its motions have been recognized, it can be compared with a stored set of possible critical situations, which reflect possible critical situations 101 as atypical motion scenarios 15. Of course, instead of the method described above, other analysis techniques and analysis methods known from the technical field of video surveillance can also be used to extract motion sequences of the user 101 from the motion sequence images 441, 442.

As shown in FIG. 1, the motion-sensing module 42 arranged further back with respect to the viewing plane has recorded a motion sequence image 442 with a critical situation 101 and sent it to the hazard analysis module 11. There, the critical situation is recognized by extraction and comparison and the hazard analysis module 11 sends a warning signal 13 to the interaction module 21. When the interaction module 21 receives this warning signal 13, the motion sequence image 442 associated with the warning signal 13 is displayed visually on the large screen region 23.

As mentioned above, in the illustrated embodiment shown in FIG. 1, small screen regions 24, 25 are defined according to the number of motion-sensing modules 41, 24, so that the motion sequence image 442 displayed on the large screen region 23 is also shown at the same time on the associated small screen region 25. Of course, the screen layout of the interaction module 21 can also be selected so that the number of small screen regions 24, 25, 26 is one region less than the number of motion-sensing modules 41, 42, so that the motion sequence image 441, 442 in which a critical situation was last recognized continues to run on the large screen region 23. As soon as a warning signal 13 is sent to the interaction module 21 again, the corresponding motion sequence image 441, 442 swaps "places" or screen regions with the motion sequence image 441, 442 displayed on the large screen region 23.

Since, as a result of the warning signal 13, the interaction module 21 also shows the motion sequence image 441, 442 displayed on a small screen region 24, 25, 26 on a larger screen region 23, it is visually emphasized. Of course, this can, for example, additionally be emphasized by a red or yellow frame. In addition, the attentiveness of the monitoring personnel can also be increased acoustically, for example by defined beeps 27. Other display layouts are also possible, for example in the event of a warning signal 13 by zooming in on the corresponding small screen region 24, 25, 26 instead of a permanently present large screen region 23.

Since a critical situation 101 is usually a dynamic event, it is entirely possible that it is recorded first in the motion sequence image 442 of the motion-sensing module 42 arranged further back in relation to the viewing plane and then in the motion sequence image 441 of the motion-sensing module 41 arranged further forward. Since both motion sequence recordings 441, 442 are analyzed simultaneously by the hazard analysis module 11, corresponding warning signals 13 which have different codings are sent successively to the interaction module. Logic is implemented in a computing unit 29 of the interaction module 21, which logic automatically changes the motion sequence image 441, 442 displayed on the large screen region 23 according to the order of the warning signals 13.

The interaction module 21 not only emphasizes the corresponding motion sequence image 441, 442, but also generates a confirmation input field 28 on the screen 22. Due to a manual tapping of the confirmation input field 28, the interaction module 21 sends the warning signal 13 to the control module 31. As a result of the transmitted warning signal 13, the control module 31 influences the travel operation F of the person-transporting installation 51. If the monitoring personnel recognize from the emphasized motion sequence image 441, 442 that the user 102 affected by the critical situation 101 can defuse it himself/herself or has defused it, the confirmation input field 28 will not be tapped and the travel operation F will not be influenced.

In other words, a set of possible critical situations 101 can be stored in the hazard analysis module 11. The set can comprise various atypical motion scenarios 15 with which motion sequences extracted from the motion sequence images 441, 442 are compared. In the event of sufficient correspondence between an extracted motion sequence and an atypical motion scenario 15, the existence of a critical situation 101 can be assumed and the warning signal 13 may be sent to the interaction module 21. Depending on the motion scenario 15 recognized, different actions can be provided as to how the travel operation F of the person-transporting installation 51 should be influenced. For this purpose, a set of instructions 17 can be stored in the hazard analysis module 11. The instructions 17 for the action to be carried out can be sent by the hazard analysis module 11 to the interaction module 21 together with the warning signal 13 depending on the critical situation 101 recognized. When the confirmation input field 28 is tapped, the instructions 17 to be carried out can be sent to the control module 31 together with the warning signal 13.

Of course, it is also possible for the warning signal 13 to contain a weighting which calls up instructions 17 corresponding to the weighting stored in the interaction module 21 and sends them to the control module 31 together with the warning signal 13 when the confirmation input field 28 is tapped. The atypical motion scenarios 15, their weighting and the associated instructions 17 for influencing the travel operation F of the person-transporting installation 51 are described in more detail below in connection with FIG. 2.

FIG. 1 shows by way of example how a user 102 of the person-transporting installation 51 stumbles and falls in its transport region 53. In this embodiment of the disclosure, the motion-sensing module 42 records this critical situation in its motion sequence image 442 and sends it, symbolically represented by the arrows, to the interaction module 21, where it is displayed on the small screen region 25 provided for this purpose. At the same time, the same motion sequence image 442 is also sent to the hazard analysis module 11. The motion sequence of the user 102 is extracted from the motion sequence image 442 with image processing methods and compared with the set of atypical motion scenarios 15 stored in the hazard analysis module 11. Since the extracted motion sequence corresponds sufficiently to one of the atypical motion scenarios 15 that defines a stumble, the hazard analysis module 11 sends a warning signal 13 with the associated "emergency stop" instruction 17 to the interaction module 21. The sending of the warning signal 13 is shown with a dash-dotted arrow.

Further describing the embodiment shown in FIG. 1, when the warning signal 13 is sent, the motion sequence image 442 of the motion-sensing module 42 is also displayed on the large screen region 23 and together with the confirmation input field 28. As soon as the monitoring personnel tap the confirmation input field 28, the warning signal 13 and the instructions 17 sent by the hazard analysis module 11 are transmitted to the control module 31. The control module 31 opens a switch 33 of a safety circuit 35 of the person-transporting installation 51, whereupon an emergency stop is immediately initiated by the controller 59 of the person-transporting installation 51. As shown by the arrow with a broken line, the safety circuit 35 reports the opening of the switch 33 to the control module 31 and from there to the interaction module 21 and displays it on the small screen region 26.

In FIG. 1, the dash-and-double-dotted arrow 37 shows that the control module 31 can also directly access the controller 59 of the person-transporting installation 51 and transmit instructions 17 thereto to influence the travel operation F. This is the case, for example, when a user 102 enters the person-transporting installation 51 counter to the current transport direction and a reduction in the transport speed is provided as an instruction 17 for this atypical motion scenario 15.

Figure 2:
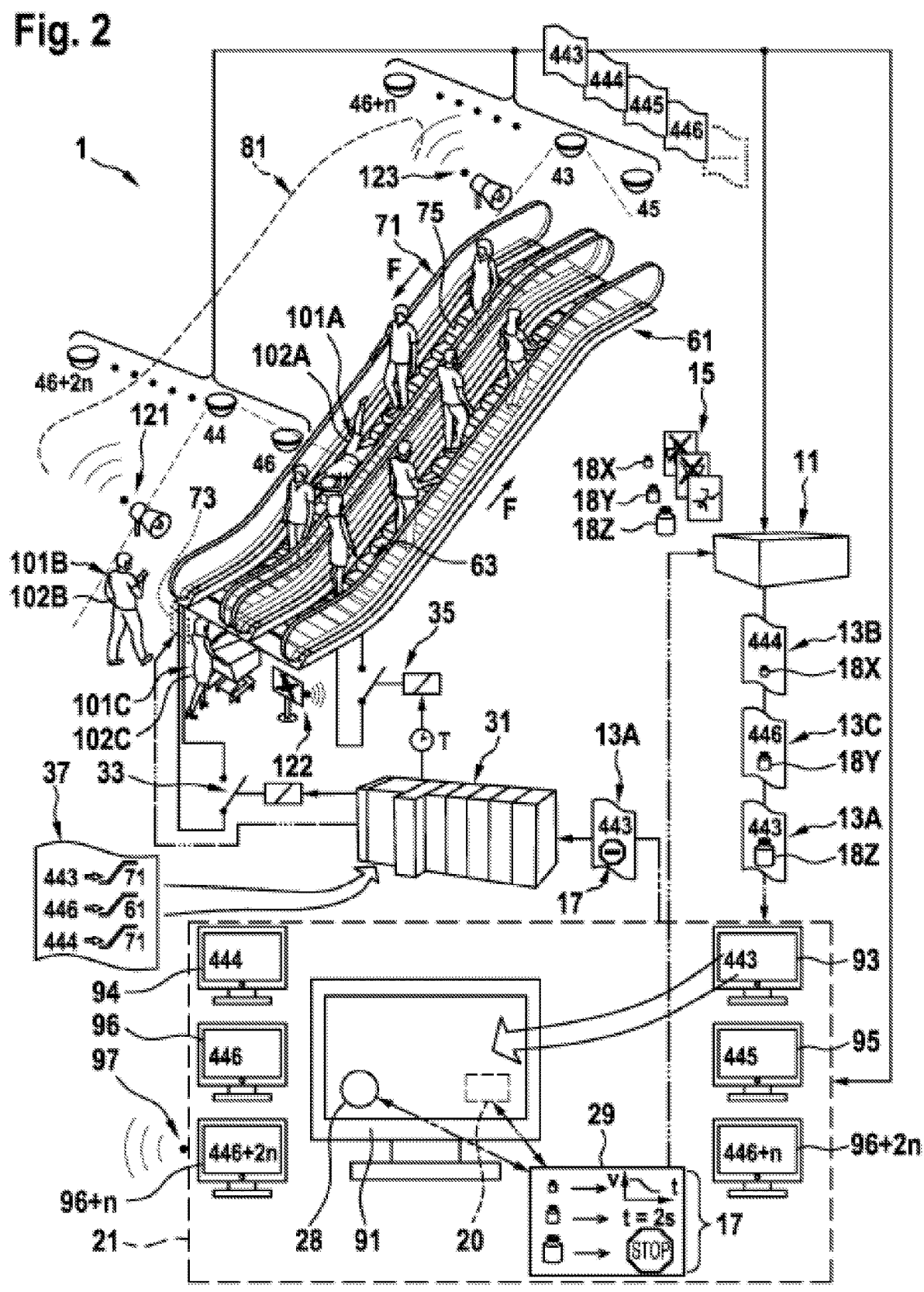
FIG. 2: is a three-dimensional view of a plurality of person-transporting installations, the travel operation of which is to be monitored, and the monitoring system of FIG. 1 adapted to monitor a plurality of person-transporting installations.

FIG. 2 is a three-dimensional view of a plurality of person-transporting installations 61, 71, 81, the travel operation F of which is to be monitored. For this purpose, the monitoring system 1 in FIG. 1 has been adapted accordingly. This monitoring system 1 also has a hazard analysis module 11, an interaction module 21 and a control module 31.

As shown in FIG. 2, in order to be able to monitor a plurality of person-transporting installations 61, 71, 81, the monitoring system 1 adapted for this has a plurality of motion-sensing modules 43, 44, 45, 46, 46+n, 46+2n. In the present embodiment, two person-transporting installations 61, 71 designed as escalators are shown in detail. The balustrade outlined with a broken line symbolizes a plurality of additional person-transporting installations 81. Each of these person-transporting installations 61, 71, 81 is associated with two motion-sensing modules 43, 44, 45, 46, 46+n, 46+2n, which capture motion sequence images 443, 444, 445, 446, . . . from the travel operation F of "their" person-transporting installations 61, 71, 81. Each of the motion-sensing modules 43, 44, 45, 46, 46+n, 46+2n has a coding 443, 444, 445, 446, . . . and encodes its motion sequence images 443, 444, 445, 446, . . . accordingly. For reasons of clarity, the same reference sign for a motion sequence image 443, 444, 445, 446, . . . is also used for its coding 443, 444, 445, 446, . . .

As in the embodiment in FIG. 1, in the embodiment in FIG. 2 the motion sequence images 443, 444, 445, 446, . . . are also sent to the hazard analysis module 11 and to the interaction module 21 at the same time. If a critical situation 101A, 101B, 101C is recognized, the hazard analysis module 11 provides an output warning signal 13A, 13B, 13C with the appropriate coding 443, 444, 445, 446, . . . and sends it to the interaction module 21 as symbolically indicated by the dash-dotted arrow.

Unlike in FIG. 1, the monitoring module 21 in FIG. 2 has a central screen 91 and additional screens 93 to 96+2n arranged in the immediate vicinity thereof, wherein there is an associated screen 93 to 996+2n for each motion-sensing module 43, 44, 45, 46, 46+n, 46+2n, which displays their motion sequence images 443, 444, 445, 446, . . . In the present embodiment, when a warning signal 13A, 13B, 13C is received, the interaction module 21 visually displays on the central screen 91 the motion sequence image 443, 444, 445, 446, . . . associated with the warning signal 13A, 13B, 13C. In order to visually emphasize the associated motion sequence image 443, 444, 445, 446, . . . , the central screen 91 has a larger screen area than the additional screens 93 to 96+2n.

As a result of the transmitted coding 443, 444, 445, 446, . . . , when a warning signal 13A, 13B, 13C is received, the interaction module 21 visually and/or acoustically emphasizes the motion sequence image 443, 444, 445, 446, . . . associated with this warning signal 13A, 13B, 13C.

Various critical situations 101A to 101C are also shown by way of example on the person-transporting installations 61, 71 shown in FIG. 2 and in the immediate vicinities thereof. In the present embodiment, a set of possible critical situations 101A, 101B, 101C is stored in the hazard analysis module 11 to match these critical situations. Specifically, the set comprises various atypical motion scenarios 15 with which motion sequences extracted from the motion sequence images 443, 444, 445, 446, . . . are compared. The possible location at which such a critical situation 101A, 101B, 101C can take place may also play a role. An atypical motion scenario 15, which represents a fall in the inclined central section of an escalator, cannot occur in the same way in the entrance of the person-transporting installation 61, 71, 81 or in one of the access regions 56, 57 (see FIG. 1). The set of atypical motion scenarios 15 can be generated, for example, through a machine learning process by using a dummy or stuntman to recreate typical critical situations 101A, 101B, 101C such as falls or careless actions on the person-transporting installation 61, 71, 81. The motion sequences detected and extracted here can be included in the set as atypical motion scenarios 15. Of course, the set can also be supplemented with additional atypical motion scenarios 15 which, during operation of the person-transporting installation 61, 71, 81, had led to an accident and which were not recognized by the hazard analysis module 11. In the event of sufficient correspondence between an extracted motion sequence and an atypical motion scenario 15, the hazard analysis module 11 can assume or determine the existence of a critical situation and send a warning signal 13A, 13B, 13C to the interaction module 21.

As symbolically represented by weights 18X, 18Y, 18Z of different sizes, the various atypical motion scenarios 15 of the set have different weightings 18X, 18Y, 18Z in the sense of a ranking. The critical situation 101A recorded by the motion-sensing module 43 is recognized in the hazard analysis module 11 as a "fall" and the associated warning signal 13A is provided with the highest weighting 18Z, since continued travel operation F could lead to serious injuries to the user 102A who has fallen.

The critical situation 101B recorded by the motion-sensing module 44 is recognized in the hazard analysis module 11 as "entering in the wrong direction" and the associated warning signal 13B is provided with the lowest weighting 18X. By entering incorrectly, the user 102B does not put himself/herself in immediate danger, but rather disturbs the oncoming users when leaving the person-transporting installation 71.

The critical situation 101C recorded by the motion-sensing module 46 is recognized in the hazard analysis module 11 as "entering with a shopping cart" and the associated warning signal 13C is provided with a medium weighting 18Y. The user 102C is in danger when he/she reaches the ascending central section of the person-transporting installation 61 with his/her shopping cart.

Unlike in FIG. 1, in FIG. 2 a set of instructions 17 is not stored in the hazard analysis module 11, but in a computer unit with storage medium 29 of the interaction module 21. The instructions 17 can be correspondingly retrieved and linked to the weighting 18X, 18Y, 18Z of the warning signal 13A, 13B, 13C. When the confirmation input field 28 is tapped, the warning signal 13A, 13B, 13C provided with the coding 443, 444, 445, 446, . . . and the instructions 17 to be implemented is transmitted to the control module 31. The travel operation F of the person-transporting installations 61, 71, 81 is influenced on the basis of the weighting or the instructions 17 associated with this weighting 18X, 18Y, 18Z. For example, in the critical situation 101A detected by the motion-sensing module 43, instructions 17 are linked to the warning signal 13A, in which the control module 31 immediately actuates a safety switch 33 of the affected person-transporting installation 71 and initiates an emergency stop.

In the critical situation 101C detected by the motion-sensing module 46, instructions 17 are linked to the warning signal 13C in which the control module 31 actuates a safety switch 35 of the affected person-transporting installation 61 with a predefined delay time T corresponding to the weighting 18Y. This provides sufficient time to warn the user 102C (see below) so that he/she leaves the entrance of the person-transporting installation 61 before he/she reaches its transport region 63 and a stop is initiated.

In the critical situation 101B detected by the motion-sensing module 44, instructions 17 are linked to the warning signal 13B, which, symbolically represented with a dash-four-dots arrow, are sent via the control module 31 to a controller 73 of the affected person-transporting installation 71. These instructions 17 cause the controller 73 to reduce the travel speed of a conveyor belt 75 of the affected person-transporting installation 71 according to a prespecified deceleration profile.

If two critical situations 101A, 101B occur at the same time on the same person-transporting installation 71 and warning signals 13A, 13B are forwarded to the control module in quick succession, the instructions 17 with the higher weighting 18Z will be implemented preferentially by the control module 31.

So that the instructions 17 are implemented in the correct person-transporting installation 61, 71, 81, the codings of the motion sequence images 443, 444, 445, 446, . . . are stored in a storage medium 37 in the control module 31 and are clearly associated with the person-transporting installations 61, 71, 81 monitored by them. In other words, when the warning signal 13A, 13B, 13C is forwarded, the control module 31 can implement the associated instructions 17 in the correct person-transporting installation 61, 71, 81.

Since a plurality of person-transporting installations 61, 71, 81 are monitored with the monitoring system 1 in FIG. 2, it is entirely possible for a plurality of critical situations 101A, 101B, 101C to occur simultaneously, as shown. In this situation, the hazard analysis module 11 sends warning signals 13A, 13B, 13C with the associated weightings 18X, 18Y, 18Z to the interaction module 21 in immediate succession. The motion sequence images 443, 444, 445, 446, . . . are now visually and/or acoustically emphasized on the central screen 91 in the interaction module 21 based on their weighting 18X, 18Y, 18Z, so that the monitoring personnel can always assess the most critical situations 101A, 101B, 101C first.

This "succession" can be implemented in different ways. This allows the corresponding motion sequence image 443, 444, 445, 446, . . . to be emphasized for a prespecified period of time before the next motion sequence image 443, 444, 445, 446, . . . is displayed. The change to the next motion sequence image 443, 444, 445, 446, . . . can also take place by the confirmation input field 28 or the cancellation input field 20 described below being tapped.

In the present embodiment of FIG. 2, the interaction module 21 generates a cancellation input field 20 in addition to the confirmation input field 28 as a result of the warning signal 13A, 13B, 13C on the screen. Due to a manual tapping of the cancellation input field 20, the interaction module 21 cancels the warning signal 13A, 13B, 13C and withdraws the associated visual and/or acoustic emphasis of the corresponding motion sequence image 443, 444, 445, 446, . . . or no longer displays it on the central screen 91.

So that unintentional or incorrect cancellation cannot lead to serious accidents, immediately after the cancellation input field 20 is tapped, the associated motion sequence image 443, 444, 445, 446, . . . is further analyzed for a prespecified time, preferably in the hazard analysis module 11. Since not only actuation of the confirmation input field 28 but also of the cancellation input field 20 is registered and processed by the computing unit 29, further analysis of the motion sequence image 443, 444, 445, 446, . . . can be initiated by feedback from the computing unit 29 to the hazard analysis module 11, as is symbolically represented by the dash— triple-dotted arrow.

In order to warn users 102A, 102B, 102C of an imminent influence on the travel operation F and/or to draw attention to any incorrect behavior, in the event of a warning signal 13A, 13B, 13C, the interaction module 21 outputs an acoustic and/or visual warning to the users 102A, 102B, 102C of the person-transporting installation 61, 71, 81 via an output module 121, 122, 123. The output module 121, 122, 123 is arranged in the region of the person-transporting installations 61, 71, 81. According to the disclosure, the control module 31 controls those output modules 121, 122, 123 which belong to the person-transporting installation 61, 71, 81 that is associated with the warning signal 13A, 13B, 13C. The visual and/or acoustic warning contains a message correlating with the critical situation 101A, 101B, 101C. This is described in more detail below on the basis of the critical situations 101A, 101B, 101C shown in FIG. 2.

In the case of the critical situation 101A, a "fall" was recognized by the hazard analysis module 11 and a corresponding warning signal 13A was generated. Its coding 443 causes the interaction module 21 to select the output module 123 that is closest to the motion-sensing module 43. For example, the acoustic warning "Attention: emergency stop of the escalator" selected based on the weighting 18Z is sent to this output module 123, which is designed as a loud-speaker, via a wireless connection 97.

In the case of the critical situation 101B, an "access in the wrong direction" was recognized by the hazard analysis module 11 and a corresponding warning signal 13B was generated. Its coding 444 causes the interaction module 21 to select the output module 121 closest to the motion-sensing module 44. For example, the acoustic warning "Attention: wrong access region" selected based on the weighting 18X is sent to this output module 123, which is designed as a loudspeaker, via a wireless connection 97.

In the case of the critical situation 101C, a "prohibited entry with shopping cart" was recognized by the hazard analysis module 11 and a corresponding warning signal 13C was generated. Its coding 446 causes the interaction module 21 to select the output module 122 closest to the motion-sensing module 46. For example, an image with a crossed-out shopping cart is sent to this output module 122, which is designed as a screen, as a visual warning via a wireless connection 97 and displayed on the screen. Of course, a warning tone can also be output in this case so that the output module attracts more attention. In principle, any device that can output an acoustic and/or visual warning can be used as output modules 121, 122, 123. So-called hologram projectors, with which, for example, virtual persons can output warnings and hand motions to the users 102A, 102B, 102C of the person-transporting installations 61, 71, 81, are particularly effective here.

Although different versions of the monitoring system are shown in FIGS. 1 and 2, it is obvious that distinctive features of one embodiment can also be used in the other embodiment. For example, the weighting shown in FIG. 2 can also be implemented in a monitoring system according to FIG. 1. Furthermore, the "automatic change" described in connection with FIG. 1 of the motion sequence image shown on the large screen region can also be implemented in a monitoring system according to FIG. 2 if the same critical situation is detected by a plurality of motion-sensing modules during its time sequence. Of course, it is also possible for the cancellation input field shown in FIG. 2 and the functions described for this purpose to be implemented in a monitoring system according to FIG. 1.

Finally, it should be noted that terms such as "having," "comprising," etc. do not preclude other elements or steps, and terms such as "a" or "one" do not preclude a plurality. Reference signs in the claims should not be considered to be limiting.

The invention claimed is:

1. A method for monitoring the travel operation of a person-transporting installation designed as an escalator or moving walkway with a monitoring system, wherein the monitoring system comprises a hazard analysis module, an interaction module, a control module, and at least one motion-sensing module which is directed toward an associated person-transporting installation and is configured to capture electronically processable motion sequence images of situations that occur on the associated person-transporting installation, the method comprising:

transmitting the motion sequence images of the at least one motion-sensing module in real time to the interaction module and to the hazard analysis module;

displaying the motion sequence images on a screen of the interaction module;

examining, concurrent with the displaying of the motion sequence images, the motion sequence images in the hazard analysis module for critical situations for users of the person-transporting installation with analysis algorithms and, based on recognizing a critical situation, sending a warning signal to the interaction module;

emphasizing, as a result of the warning signal, visually and/or acoustically, the motion sequence image displayed on the interaction module and generating a confirmation input field on the screen;

wherein, based on a manual input of the confirmation input field, the interaction module sends the warning signal to the control module and as a result of the transmitted warning signal, the control module influences the travel operation of the person-transporting installation.

2. The method of claim 1, wherein a set of possible critical situations is stored in the hazard analysis module, wherein the set comprises various atypical motion scenarios with which motion sequences extracted from the motion sequence images are compared, and in the event of sufficient correspondence between an extracted motion sequence and an atypical motion scenario, the existence of a critical situation is assumed and a warning signal is sent to the interaction module.

3. The method of claim 2, wherein the various atypical motion scenarios in the set have different weightings in the sense of a ranking.

4. The method of claim 3, wherein the travel operation is influenced based on the weighting such that, according to the weighting, the control module immediately actuates a safety switch of the affected person-transporting installation and initiates an emergency stop, or the control module actuates a safety switch of the affected person-transporting installation with a predefined delay time corresponding to the weighting and initiates an emergency stop, or an instruction is sent to a controller of the affected person-transporting installation, which instruction causes the controller to reduce the travel speed of a conveyor belt of the affected person-transporting installation according to a prespecified deceleration profile.

5. The method of claim 2, wherein the monitoring system has a plurality of motion-sensing modules that capture motion sequence images from at least two different person-transporting installations, wherein each of the motion-sensing modules has a coding and provides its motion sequence images with this, wherein the hazard analysis module provides the warning signal with appropriate coding and in the control module the motion-sensing modules are clearly assigned to the person-transporting installation monitored by them via their coding and wherein as a result of the warning signal the interaction module only visually and/or acoustically emphasizes the motion sequence image associated with this warning signal and transmits the warning signal provided with the coding to the control module when the confirmation input field is tapped.

6. The method of claim 5, wherein the hazard analysis module sends warning signals with the associated weighting to the interaction module in immediate succession when a plurality of critical situations are recognized simultaneously, wherein the motion sequence images are emphasized visually and/or acoustically successively based on their weighting.

7. The method of claim 2, wherein as a result of the warning signal on the screen, the interaction module also generates a cancellation input field in addition to the confirmation input field, and due to a manual tapping of the cancellation input field, the interaction module cancels the warning signal and withdraws visual and/or acoustic emphasis from the corresponding motion sequence image.

8. The method of claim 2, wherein the screen is subdivided into a plurality of small screen regions and one large screen region wherein there is an associated screen region for each motion-sensing module and, when a warning signal is received, the interaction module visually displays the motion sequence image associated with the warning signal on the large screen region.

9. The method of claim 1, wherein the monitoring system has a plurality of motion-sensing modules that capture motion sequence images from at least two different person-transporting installations, wherein each of the motion-sensing modules has a coding and provides its motion sequence images with this, wherein the hazard analysis module provides the warning signal with the appropriate coding and in the control module the motion-sensing modules are clearly assigned to the person-transporting installation monitored by them via their coding and wherein as a result of the received warning signal the interaction module only visually and/or acoustically emphasizes the motion sequence image associated with this warning signal and transmits the warning signal provided with the coding to the control module when the confirmation input field is tapped.

10. The method of claim 9, wherein the hazard analysis module sends warning signals with the associated weighting to the interaction module in immediate succession when a plurality of critical situations are recognized simultaneously, wherein the motion sequence images are emphasized visually and/or acoustically successively based on their weighting.

11. The method of claim 1, wherein as a result of the warning signal on the screen, the interaction module also generates a cancellation input field in addition to the confirmation input field, and due to a manual tapping of the cancellation input field, the interaction module cancels the warning signal and withdraws visual and/or acoustic emphasis from the corresponding motion sequence image.

12. The method of claim 11, wherein, after the confirmation input field or the cancellation input field has been tapped, the display of the confirmation input field and/or the cancellation input field on the screen is deleted.

13. The method of claim 12, wherein, immediately after the cancellation input field has been tapped, the associated motion sequence image is preferably analyzed for a prespecified time in the hazard analysis module.

14. The method of claim 11, wherein, immediately after the cancellation input field has been tapped, the associated motion sequence image is preferably analyzed for a prespecified time in the hazard analysis module.

15. The method of claim 1, wherein the screen is subdivided into a plurality of small screen regions and one large screen region wherein there is an associated screen region for each motion-sensing module and, when a warning signal is received, the interaction module visually displays the motion sequence image associated with the warning signal on the large screen region.

16. The method of claim 1, wherein the interaction module has a central screen and additional screens arranged in the immediate vicinity thereof, wherein there is an associated screen for each motion-sensing module and, when a warning signal is received, the interaction module visually displays the motion sequence image associated with the warning signal on the central screen.

17. The method of claim 1, wherein, in the event of a warning signal, the interaction module outputs an acoustic warning to users of the person-transporting installation via an output module, and wherein the output module is arranged in a region of the person-transporting installation with which the warning signal is associated.

18. The method of claim 17, wherein the visual and/or acoustic warning contains a message correlating with the critical situation.

19. The method of claim 1, wherein, in the event of a warning signal, the interaction module outputs a visual warning to users of the person-transporting installation via an output module, and wherein the output module is arranged in a region of the person-transporting installation with which the warning signal is associated.

20. A monitoring system for carrying out the method of claim 1 comprising the hazard analysis module, the interaction module, the control module, and the at least one motion-sensing module which are connected to one another via a data network.

* * * * *